J. HUGHES.

Harness-Pads.

No. 5,628. Reissued Oct. 28, 1873.

WITNESSES.

P. Langandt Lane

Boyd Eliot

John Hughes

INVENTOR.

AM. PHOTO-LITHOGRAPHIC Co. N.Y. (OSBORNE'S PROCESS)

UNITED STATES PATENT OFFICE.

JOHN HUGHES, OF NEWARK, NEW JERSEY.

IMPROVEMENT IN HARNESS-PADS.

Specification forming part of Letters Patent No. 91,747, dated June 22, 1869; reissue No. 5,628, dated October 28, 1873; application filed August 5, 1873.

*To all whom it may concern:*

Be it known that I, JOHN HUGHES, of Newark, county of Essex and State of New Jersey, have invented certain Improvements in Harness-Pads, of which the following is a specification:

This invention consists, first, in securing the plate which carries the check-hook to the frame of the harness-pad at one end by means of a socket, and at the other end by means of a set-screw, as will be hereinafter described; second, in providing the iron frame with certain apertures, through which to pass the nuts to secure the terrets in place after the pad is made up; third, in combining a welt with the bottom leather of the pad to prevent its being cut or worn by the edges of the iron frame.

Figure 1:
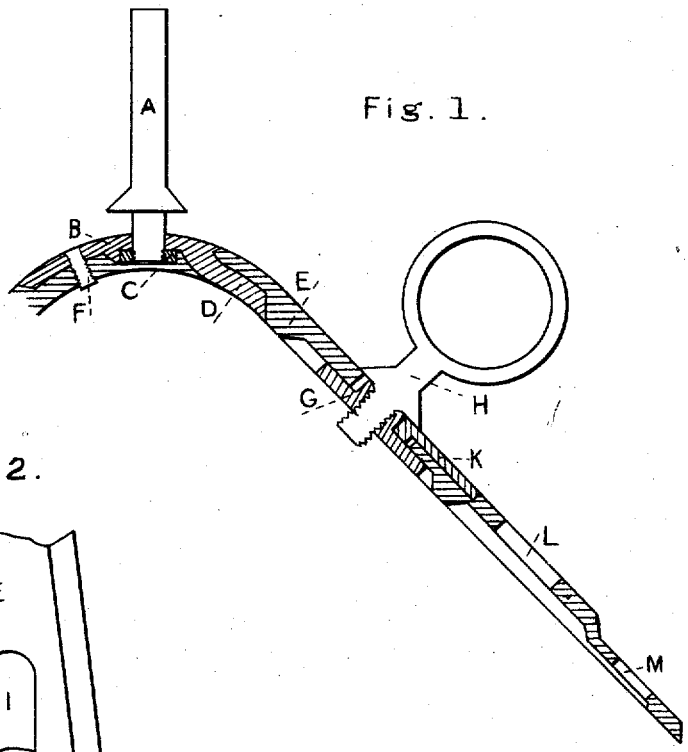
Figure 2:
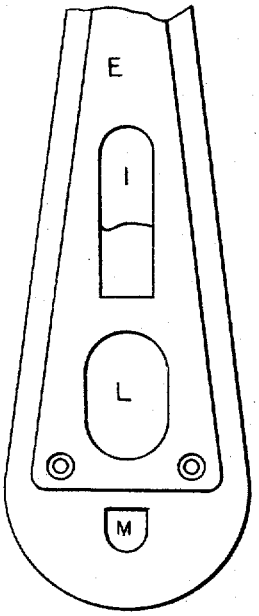
Figure 3:
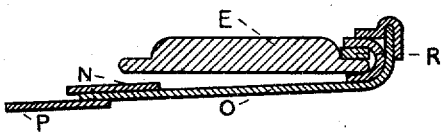

Figure 1 is a longitudinal section of a portion of the iron frame with the check-rein hook and one of the terrets in elevation. Fig. 2 is a plan of a portion of the iron frame, and shows the openings or apertures for nuts, &c. Fig. 3 is a transverse section of the frame and bottom leather, showing one edge complete, but the other edge is free or not joined together.

At A is the check-rein hook, the shank of which is square, and fits into a corresponding hole in a small plate, B, and held there by a screw-nut, as at C, on the under side of the plate B. One end of said plate or strip of metal is curved down, as shown at D, to catch under the iron frame of the pad E, as shown at Fig. 1, and the other end of the hook-plate is fastened upon the frame E by a screw, as shown at F; consequently the hook is first firmly fixed to an adjunct or supplemental plate, so that it cannot turn or move thereon, and then said plate is fastened to the pad-frame firmly by simply using one screw.

The second part of this invention is for certain openings, or one or more apertures, through the iron frame and toward its lower end, through which the nut, as at G, for the terret H, may be slipped to its place after the pad is made. (Best shown in Fig. 2.) At I is an opening or aperture for the terret, and is, or may be, large enough for the nut to be slipped through, and when so done the excess of the opening may be closed by a small plate, as at K, Fig. 1. At L is another opening below the terret, which allows the nut to be inserted or slipped through the frame after the cushion is attached to it, and then adjusted to the proper point for the terret. So, also, the nut to hold the lower end of the back-strap on the frame, as at M, may be passed through the opening L, and slipped down to its place.

This part of the invention is of special importance in putting the nuts in their proper places after the pad is made up or attached to the frame, and also in the case of introducing new nuts for new trimmings, or for repairs.

The third part of the invention consists in attaching a welt, as at N, to the leather O, which forms the lower portion of the pad, and which serves as a protection to the leather where it curves up upon the edges of the iron frame E, as best shown in Fig. 3; and said welt also gives additional strength to support the binding, as the upper edges of the welt are turned over and fastened with the binding to the strip at R.

Said strip and binding are fully described in former patent granted to me; but the welt in this combination is new, and constitutes a valuable improvement in a harness-pad.

I therefore claim—

1. The plate B, fastened to the frame by a socket and by a screw, F, in combination with the nut C for holding the hook A, substantially as described.

2. The frame E for a harness-pad, with depressions in its upper and under sides for the reception of the plate B and nuts G for the terrets, as described.

3. The welt N, secured upon the bottom pieces O P by a single seam in a flat condition before being applied to the pad, in the manner and for the purpose specified.

4. In an iron frame for harness-pads, the holes L L, through which to pass the nuts after the pad is made up, substantially as described, for the purpose specified.

5. The removable plate K for closing the openings at I, as described, and for the purposes set forth.

JOHN HUGHES.

Witnesses:

P. VANZANDT LANE,

BOYD ELIOT.